United States Patent [19]

Tsuji et al.

[11] Patent Number: 5,111,297
[45] Date of Patent: May 5, 1992

[54] PICTURE-IN-PICTURE DOUBLE-SCANNING TELEVISION RECEIVER

[75] Inventors: Toshiaki Tsuji; Kiyoshi Imai, both of Ibaraki; Atsushi Ishizu, Neyagawa, all of Japan

[73] Assignee: Matsushita Electric Industrial Co., Ltd., Osaka, Japan

[21] Appl. No.: 560,847

[22] Filed: Jul. 31, 1990

[30] Foreign Application Priority Data

Aug. 4, 1989 [JP] Japan .................................. 1-203267

[51] Int. Cl.⁵ ...................... H04N 5/262; H04N 5/44; H04N 5/45; H04N 5/265
[52] U.S. Cl. ...................................... 358/183; 358/22; 358/180; 358/188
[58] Field of Search ................... 358/183, 22, 188, 180

[56] References Cited

U.S. PATENT DOCUMENTS

| | | | |
|---|---|---|---|
| 4,724,487 | 2/1988 | Casey | 358/183 |
| 4,816,915 | 3/1989 | Imai et al. | 358/181 |
| 4,930,014 | 5/1990 | Maeda et al. | 358/183 |

FOREIGN PATENT DOCUMENTS 55-39472  3/1980  Japan .
61-166279  7/1986  Japan .

OTHER PUBLICATIONS

Toshiba Review, "Digital Television with Enhanced Picture Quality," vol. 42, No. 12, pp. 892-895, Dec. 1, 1987.

Primary Examiner—James J. Groody
Assistant Examiner—Glenton B. Burgess
Attorney, Agent, or Firm—Stevens, Davis, Miller & Mosher

[57] ABSTRACT

A double-scanning non-interlaced television receiver performs scanning line interpolation by using a memory to reproduce a 1/60 second frame with 525 scanning lines. The receiver has a picture-in-picture (P-in-P) function which inserts a frame (sub-picture) into a part of another frame (main picture). The receiver is provided with a signal processing circuit for implementing the scanning line interpolation and a memory having a frame-wide capacity for producing a sub-picture. The receiver (1) produces a video signal for the main scanning line and a video signal for the interpolated scanning line for the main picture and a video signal for the main scanning line and a video signal for the interpellated scanning line for the sub-picture and (2) performs a double-scanning conversion, thereby providing a sub-picture without causing line flicker.

13 Claims, 9 Drawing Sheets

FIG. 7
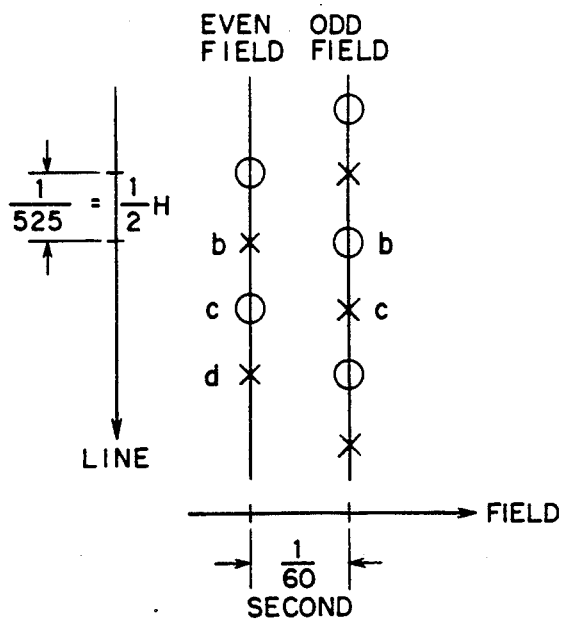
FIG. 8
(a) OPERATION OF DOUBLE-SCANNING CONVERSION FOR MAIN SCANNING LINE
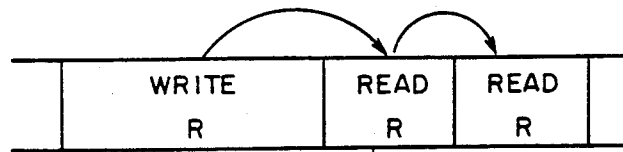
(b) OPERATION OF DOUBLE-SCANNING CONVERSION FOR MAIN SCANNING LINE
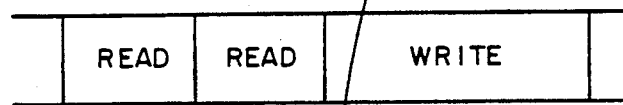
(c) OPERATION OF DOUBLE-SCANNING CONVERSION FOR INTERPOLATED SCANNING LINE
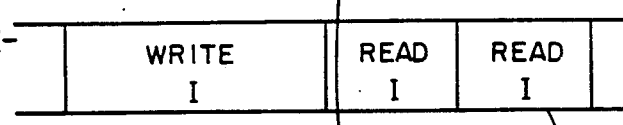
(d) OPERATION OF DOUBLE-SCANNING CONVERSION FOR INTERPOLATED SCANNING LINE
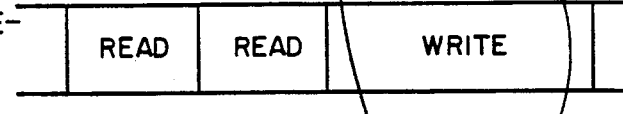
(e) COMPOSITE MAIN AND SUB PICTURE VIDEO SIGNAL OUTPUT
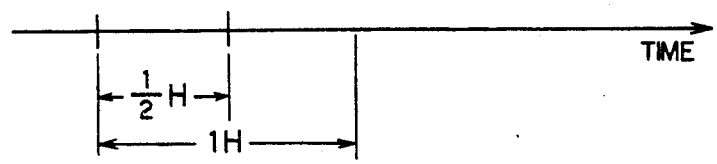

PICTURE-IN-PICTURE DOUBLE-SCANNING TELEVISION RECEIVER

BACKGROUND OF THE INVENTION

1. Field of the Invention

This invention relates to a picture-in-picture television function (hereinafter referred to as a P-in-P function) of a double-scanning television receiver which performs sequential scanning conversion.

2. Description of the Related Art

Recent television receivers perform scanning line interpolation and sequential scanning line conversion to improve the picture quality, as done in the improved-definition television (IDTV). When such an improved television receiver is provided with the picture-in-picture function, it is essential that a sub-picture should also have the improved picture quality.

The conventional P-in-P function will be explained with reference to FIGS. 1 through 3. FIG. 1 is a block diagram of the P-in-P function based on a one-field memory of the interlaced scanning television receiver. (JP-A-55-39472 and 61-166279)

In FIG. 1, 61 designates an input terminal for the video signal of a main picture, 62 an input terminal for the video signal of a sub-picture, and 63 a one-field memory for storing the input video signal of a sub-picture for one field and it is capable of writing in and reading out the signal in every horizontal scanning period (one line). 64 designates a circuit for modifying the interlacing of the sub-picture, 65 a circuit for inserting the sub-picture in the main picture, and 66 an output terminal for the video signal of the composite main and sub picture.

The operation of the television receiver having the P-in-P function based on the one-field memory arranged as described above will be explained with reference to FIG. 2. FIG. 2 is a timing chart for the arrangement shown in FIG. 1, and this is a case where a sub-picture has horizontal and vertical dimensions that are ⅓ those of an associated main picture. In FIG. 2, I denotes the video signal of the sub-picture, II denotes the video signal of the main picture, and III is intended to explain the operation of the one-field memory 63, in which IV shows the write timing and V shows the read timing for the memory.

Writing in the field memory 63 of FIG. 1 is performed at every horizontal scanning line when a picture is vertically scaled down to half size, and at every three scanning lines when a picture is vertically scaled down to one-third size. Reading of the field memory takes place at a timing corresponding to the position of insertion in the main picture with a clock frequency high enough to meet the scale factor. In FIG. 2, the writing takes place in every third horizontal period, and the reading takes place three times as fast as the writing thereby to compress the sub-picture to have dimensions of ⅓ size. Since writing and reading take place sequentially in one horizontal period, the maximum time length for inserting a sub-picture in a main picture can not extend over an entire period, but, in case of NTSC, a ¾ line period is sufficient (shown by hatching) in consideration of the horizontal flyback period and the like. The video signal of a main picture and that of a sub-picture are derived from completely independent transmission systems, and they are not synchronous with each other. Therefore, reading from the field memory 63 may overtake writing therein with high probability, and in this case the content of the previous field will be read out during writing. This action causes the sub-picture to have opposite interlacing, resulting in a non-smooth picture. The interlace correction circuit 64 in FIG. 1 is intended to correct the interlacing at the timing of a vertical sync pulse of the sub-picture, and it detects field switching in the midst of the sub-picture to modify the reading address so that correct interlacing takes place at that point.

FIG. 3 is a block diagram of a double-scanning P-in-P block which is intended for a double-scanning television receiver based on the sequential scanning conversion scheme shown in FIG. 1. 71 designates an input terminal for the video signal of the main picture, 72 the input terminal for the video signal of the sub-picture, 73 a scanning line interpolation circuit which produces interpolated data for double-scanning conversion, 74 and 75 field memories for the video signal of a sub-picture, each being capable of writing in and reading out the signal at every line, of which the field memory 74 stores the present lines and the field memory 75 stores the interpolated lines, 76 an interlace correction circuit which functions identically to the interlace correction circuit 64 in FIG. 1, 77 and 78 main and sub picture composing circuits, 79 a double-speed conversion circuit, and 80 an output terminal for the composite video signal. The sub-picture video signal is written in the two field memories 74 and 75, and both contents are read out simultaneously in synchronism with the main picture video signal, thereby accomplishing the P-in-P function. Because of a doubled number of lines for the sub-picture as compared with the conventional scheme, a high quality P-in-P picture can be realized. (Refer to "Digital Television with Enhanced Picture Quality", Toshiba Review, Vol. 42, No. 12, Dec. 1 1987)

The above-mentioned double-scanning P-in-P television receiver operates, for the main picture, to make the sequential scanning conversion through the interpolation based on a motion adaptive process, while, for the sub-picture, it operates to make sequential scanning conversion for the interlaced scanning video signal after it is subjected to line skipping thereby to be contracted, and therefore the television receiver has a problem of line flicker in the sub-picture.

SUMMARY OF THE INVENTION

This invention is intended to overcome the deficiencies of the above-mentioned conventional art, and it is the prime object to provide a picture-in-picture television receiver which produces a sub-picture without incurring line flicker.

In order to achieve the above object, the picture-in-picture television receiver of the present invention has the following construction.

(1) It incorporates a sub-picture production means which receives the interlaced scanning sub-picture video signal and produces, for non-interlaced scanning, a sub-picture video signal for the main scanning line and a sub-picture video signal for the interpolated scanning line so that the relative phase relationships between respective sub-picture video signals become identical with each other.

(2) The sub-picture production means is provided with a first and second memory means for storing the interlaced scanning sub-picture video signal which has been received, a control means which controls (1) read out, from the first and second memory means, either the same field-basis signal twice or the frame-basis signal, and (2) output of the signal read out from the first memory means as the sub-picture video signal for the main scanning line and the signal read out of the second memory means as the sub-picture video signal for the interpolated scanning line, and a switch means which is operated by the output of the control means to read out selectively the signals from the first and second memory means either on the field basis or on the frame basis.

(3) It is provided with a two-input to one-output multiplexer which switches, on the field basis, between the interpolated scanning line video signal for converting the input interlaced scanning video signal into non-interlaced scanning mode and the interlaced scanning video signal, and first and second memories that are connected to the output of the multiplexer for storing one frame.

(4) It is provided with a signal processing circuit including a first frame memory which inputs the video signal of the interlace-scanned main picture and outputs, for non-interlaced scanning a main picture video signal for the interpolated scanning line, and a second frame memory which inputs the video signal of the interlaced scanning sub-picture and outputs, for non-interlaced scanning, a sub-picture video signal for the interpolated scanning line, a two-input to one-output multiplexer which switches, on the field basis, the sub-picture video signal for interlaced scanning and the output signal of the signal processing circuit including the second frame memory, and first and second memories connected to the output of the multiplexer for storing one frame.

The inventive television receiver having the foregoing arrangement can perform the following operations.

In connection with the arrangement of items (1) and (2), by reading the same video signal twice continuously from the memory for one-frame period, while skipping one field of the sub-picture video signal and making the line signal of the main scanning and that of the interpolated scanning to be coincident on the same line, a sub-picture without incurring line flicker can be realized. The provision of a switch for controlling whether field skipping for the sub-picture is performed allows the choice of a sub-picture without line flicker through one-field skipping or a smoother sub-picture using a video signal employing all fields at a risk of line flicker.

In connection with the arrangement of item (3), by using the output signal of the signal processing circuit including the frame memory for the main picture video signal and the input video signal as a sub-picture video signal when the sub-picture and the main picture are the same, a sub-picture without line flicker can be accomplished.

In connection with the arrangement of item (4), by providing frame memories for the main picture video signal and the sub-picture video signal, a motion detection circuit, a scanning line interpolation circuit, motion adaptive noise elimination circuit, etc., a sub-picture with enhanced picture quality and without line flicker can be realized.

BRIEF DESCRIPTION OF THE DRAWINGS

FIG. 7 is a diagram used to explain the relationship among pixels based on the arrangement of FIG. 6;

FIG. 8 is a timing chart used to explain the operation of the double-scanning conversion circuit;

DESCRIPTION OF THE PREFERRED EMBODIMENTS

The picture-in-picture television receivers embodying the present invention will be described with reference to the drawings.

Figure 1:
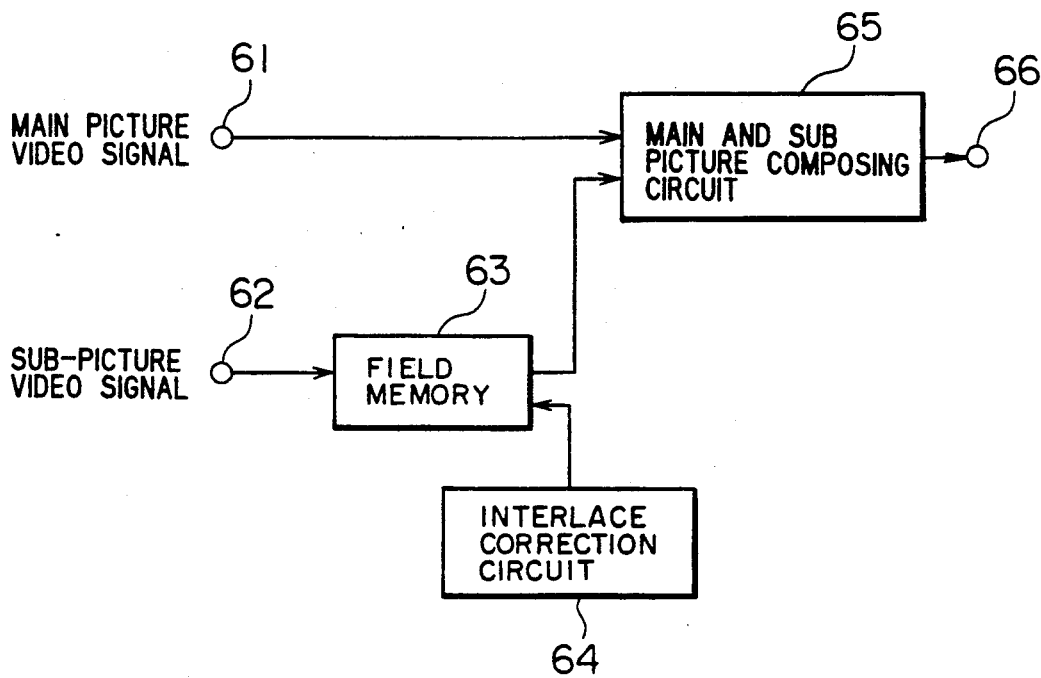
FIG. 1 is a block diagram showing an example of the conventional picture-in-picture television receiver.
Figure 2:
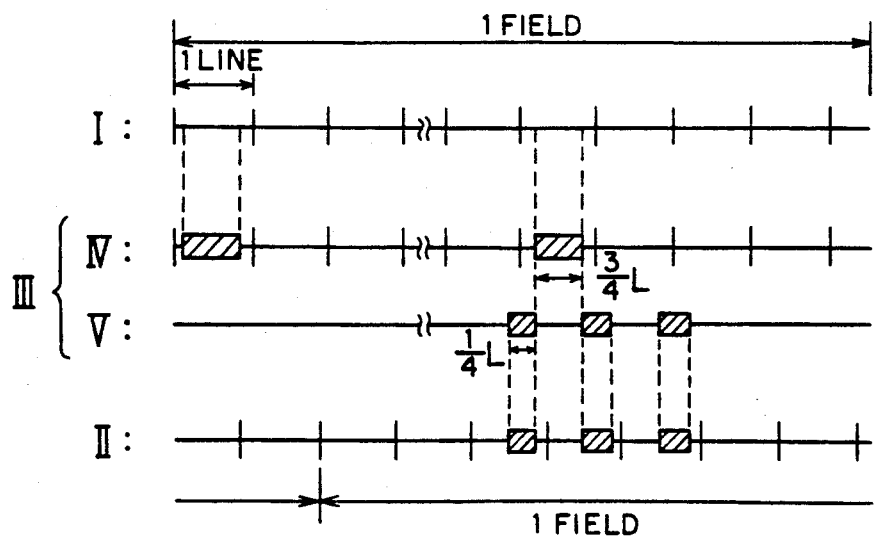
FIG. 2 is a timing chart used to explain the arrangement of FIG. 1.
Figure 3:
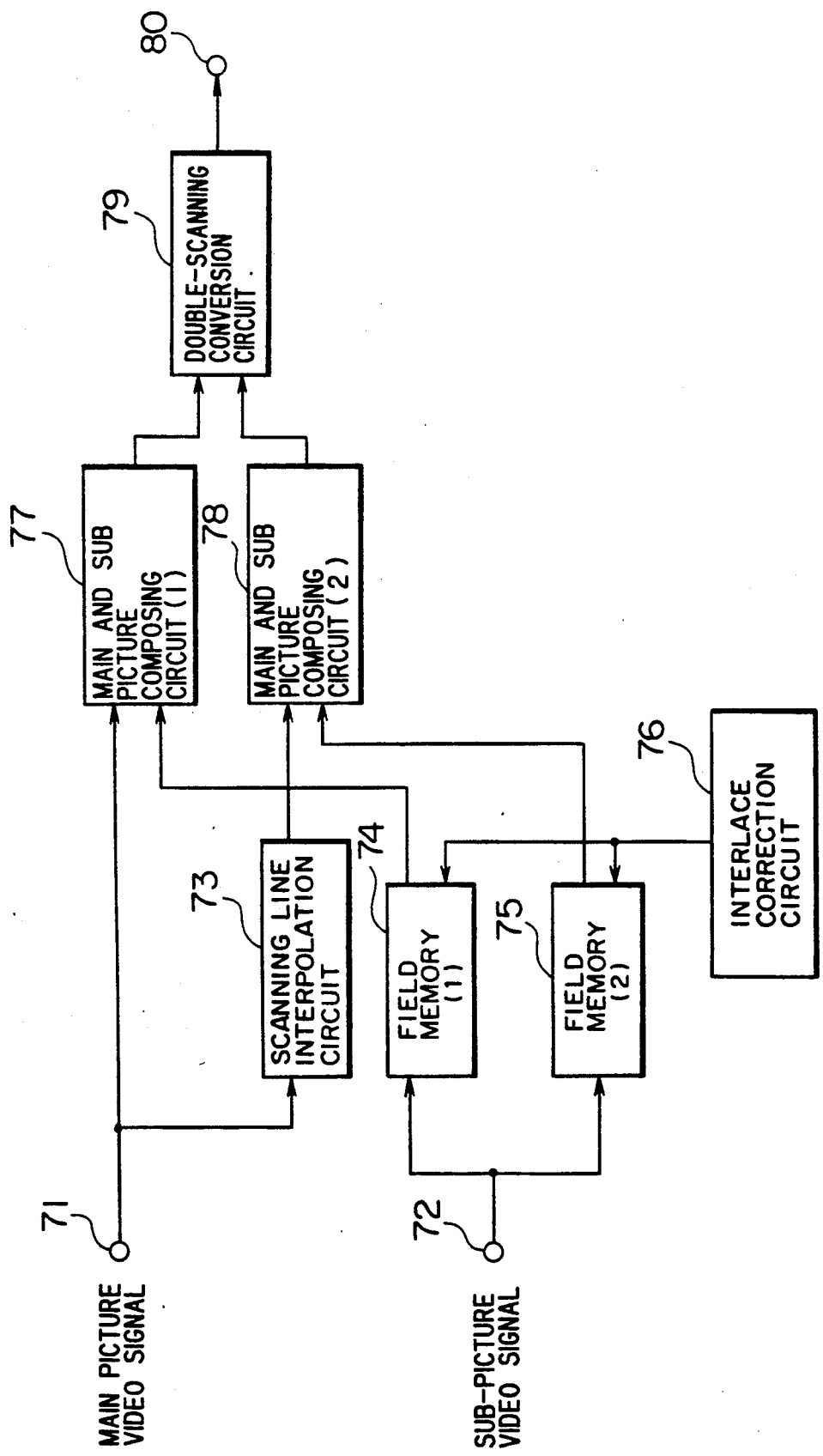
FIG. 3 is a block diagram showing an example of the conventional double-scanning picture-in-picture television receiver.
Figure 4:
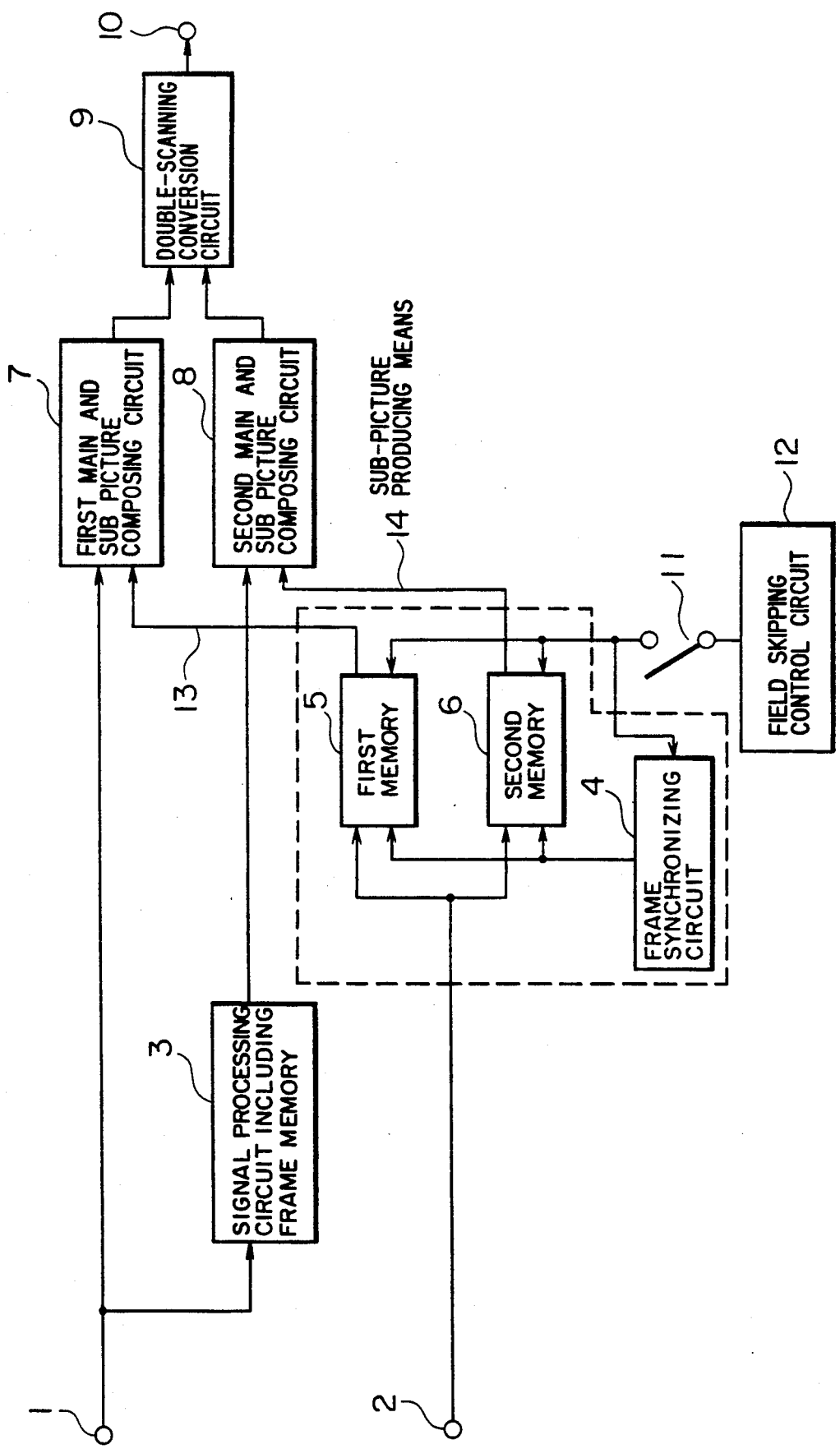
FIG. 4 is a block diagram of the picture-in-picture television receiver based on the first embodiment of this invention.

FIG. 4 is a block diagram showing the picture-in-picture television receiver according to the first embodiment of this invention. In the figure, indicated by 1 is an input terminal for the main picture video signal, 2 is an input terminal for the sub-picture video signal, and 3 is a signal processing circuit including a frame memory and it performs frame motion detection and scanning line interpolation for the main picture video signal. 4 is a frame synchronizing circuit which performs control so that memory reading does not overtake memory writing. 5 and 6 are first and second memories for storing the sub-picture video signal, 7 and 8 are first and second main and sub picture composing circuits which insert the sub-picture video signal into the main picture video signal. In this embodiment, the first main and sub picture composing circuit 7 composes the main picture video signal with the sub-picture video signal for the present scanning line, and the second main and sub picture composing circuit 8 composes the main picture interpolated scanning line with the sub-picture video signal for the interpolated scanning line. 9 is a double-scanning conversion circuit which incorporates two-line memories for the main scanning line and the interpolated scanning line. 10 is an output terminal for the composite main and sub picture video signal, and 12 is a control circuit for skipping one field in the sub-picture. 11 is a switch for controlling the selection or non-selection of the sub-picture field skipping. With the switch 11 being closed, one-field skipping takes place for the first and second memories 5 and 6, or with the switch 11 being opened, the one-field skipping does not take place. 13 and 14 are output lines for the sub-picture video signal for the main scanning line and the sub-picture video signal for the interpolated scanning line.

Figure 5:
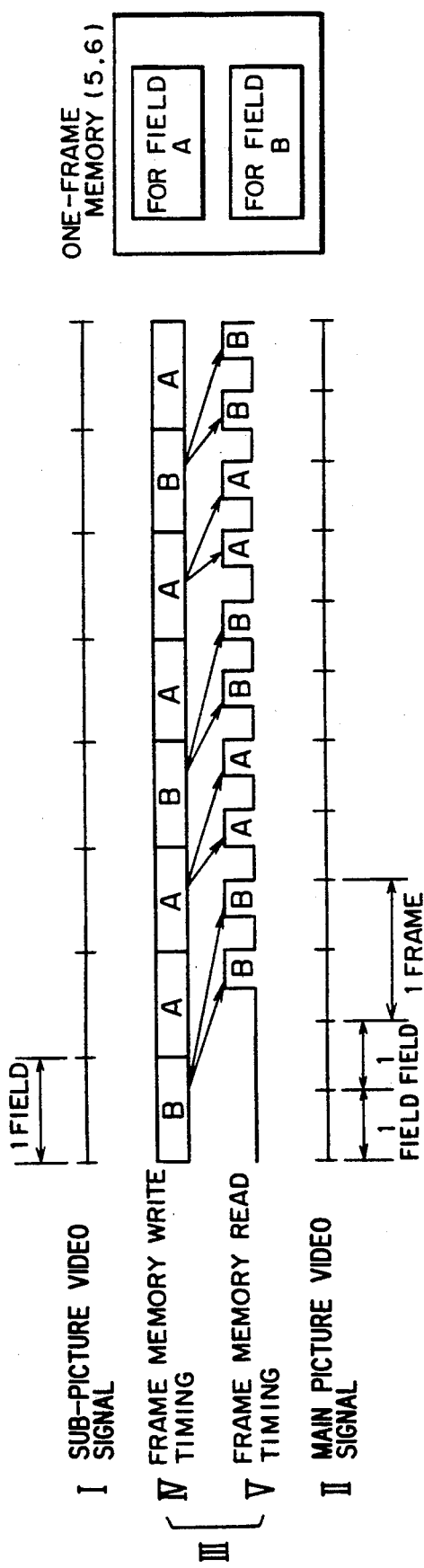
FIGS. 5A and 5B form a timing chart used to explain the arrangement of FIG. 4.

The operation of the picture-in-picture television receiver arranged as described above will be explained with reference to FIGS. 5A and 5B. FIG. 5A is a timing chart showing the writing and reading of frame memories which are used as the first and second memories 5 and 6 for storing a frame of a picture, and FIG. 5B is a block diagram showing in brief the arrangement of the frame memories 5 and 6. In FIG. 5A I indicates the sub-picture video signal, II the main picture video signal, IV the timing of writing for the frame memories 5 and 6, and V the timing of reading for the frame memories 5 and 6. The one-frame memories 5 and 6 store video signals for two fields, i.e., the contents of field A and field B, respectively, of the sub-picture video signal. The frame memories 5 and 6 are read out on the basis of the frame unit of the main picture, alternately for the content of field A and the content of field B. In this case, the content of each field is read out twice for each frame. Writing in the frame memories 5 and 6 is controlled by the frame synchronizing circuit 4 on the basis of the relationship between frame pulse of the main picture video signal, the position of the sub-picture and the phase of the sub-picture video signal so that reading does not overtake writing. The write and read timings for the frame memories 5 and 6 shown in FIG. 5 exemplify the scheme by which reading does not overtake during writing.

Figure 6:
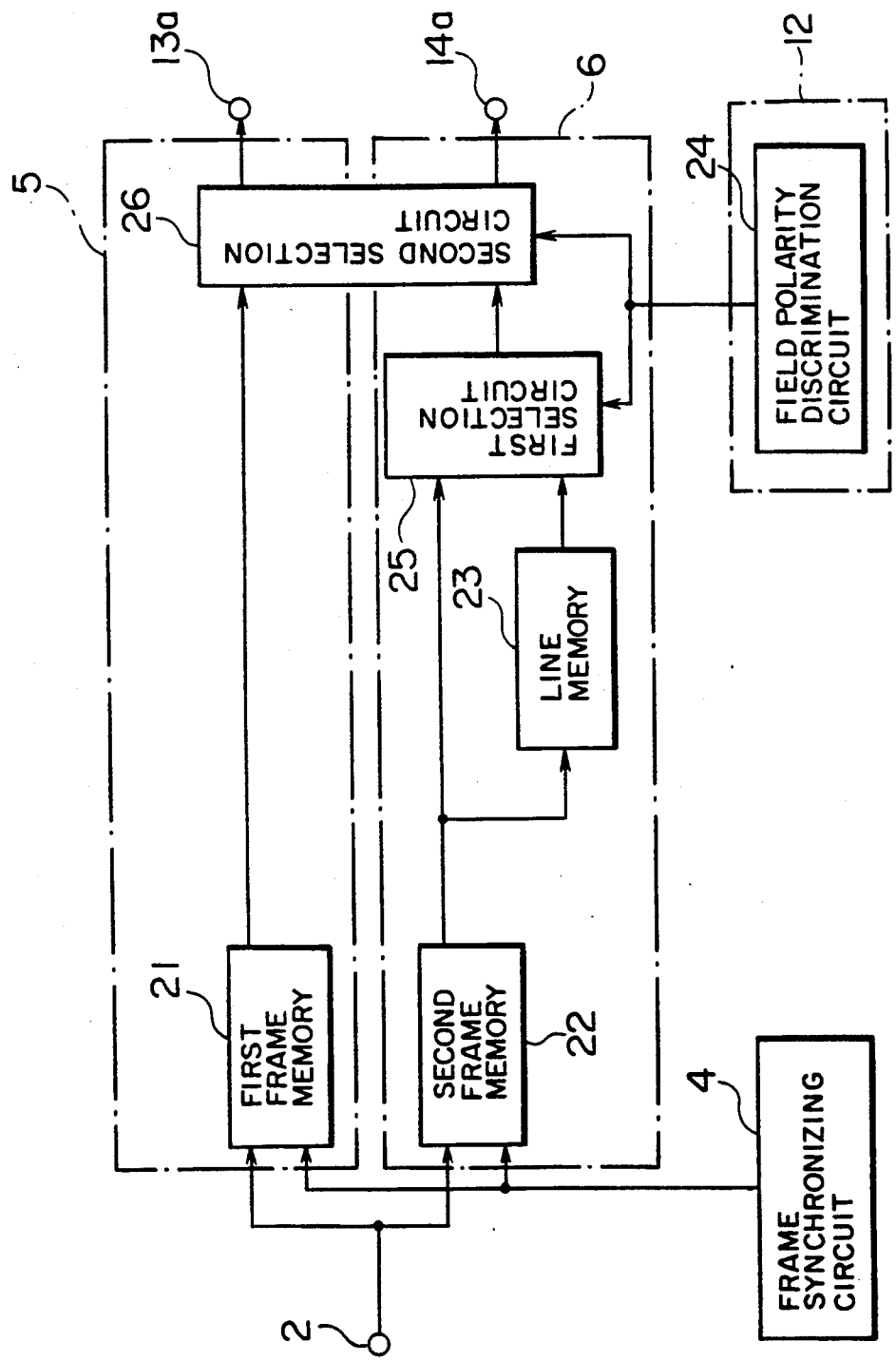
FIG. 6 is a block diagram showing an example of the arrangement for producing a sub-picture video signal through one-field skipping.

Next, an example of the circuit for producing a sub-picture video signal for the main scanning line and a sub-picture video signal for the interpolated scanning line, which are placed on the signal lines 13 and 14, will be explained for its arrangement and operation with reference to FIGS. 6 and 7. FIG. 6 is a block diagram showing schematically the operation of one-field skipping when the switch shown in FIG. 4 is in the closed position. In FIG. 6, 2 indicates an input terminal for the sub-picture video signal, and 21 and 22 are first and second frame memories connected to the sub-picture video signal input terminal 2. 4 is a frame synchronizing circuit, and 23 is a line memory connected to the output of the second frame memory 22. 24 is a field polarity discrimination circuit which discriminates the field polarity of the main picture video signal and produces a discrimination signal. 25 is a first selection circuit which selects the output signal of the second frame memory 22 or the output signal of the line memory 23 in response to the field polarity discrimination signal of the main picture video signal. 26 is a second selection circuit which selects the output signal of the first frame memory 21 or the output signal of the first selection circuit 25 in response to the field polarity discrimination signal of the main picture video signal. 13a and 14a are output terminals of the video signals for the main scanning line and the interpolated scanning line, and these output terminals are connected to the output signal lines 13 and 14. The figure is intended for better understanding of the operation of FIG. 4, and actually the operational control is implemented through the control of the reading reset pulses for the first and second memories 5 and 6.

FIG. 7 is a diagram showing the relationship among pixels with the intention of explaining the operation of the arrangement shown in FIG. 6. In FIG. 7 the horizontal direction represents the field direction, and one field picture is produced at every 1/60 second. The vertical direction represents the line direction, and 2:1 interlaced scanning produces a piece of picture at 2/525 multiplied by the height of the face plate. In FIG. 7, marked by "o" is a video signal of the main scanning line, and marked by "x" is a video signal of the interpolated scanning line.

In FIG. 7, when the main picture video signal is an even field, with the output signal of the first frame memory 21 being a main scanning line video signal c and the output signal of the second frame memory 22 being an interpolated scanning line video signal d, the line memory 23 produces an output signal which is the interpolated scanning line video signal b of the previous line. In order for the sub-picture video signal c for the main scanning line appearing on the output terminal 13a to be the sub-picture video signal d for the interpolated scanning line appearing on the output terminal 14a, the first selection circuit 25 selects the output signal of the second frame memory 22, the second selection circuit 26 supplies the output signal c of the first frame memory 21 to the output terminal 13a of the sub-picture video signal for the main scanning line and supplies the output signal d of the second frame memory 22 to the output terminal 14a of the sub-picture video signal for the interpolated scanning line.

When the main picture video signal is an odd field, the signal b is supplied to the output terminal 13a of the sub-picture video signal for the main scanning line and the signal c is supplied to the output terminal 14a of the sub-picture video signal for the interpolated scanning line, so that the video signal of the odd field is placed on the same line as of the even field, thereby preventing line flicker. In operation, the first selection circuit 25 selects the output signal b of the line memory 23, and the second selection circuit 26 delivers the output signal b of the first selection circuit 25 to the output terminal 13a of the sub-picture video signal for the main scanning line and delivers the output signal c of the frame memory 21 to the output terminal 14a of the sub-picture video signal for the interpolated scanning line. This switching is accomplished by the output signal of the field polarity discrimination circuit 24, and in this embodiment video signals of odd field are skipped. If field skipping is not implemented, the first and second selection circuits 25 and 26 are operated so that the output signal of the first frame memory 21 is supplied to the output terminal 13a and the output signal of the second frame memory 22 is supplied to the output terminal 14a irrespective of the field polarity of the main picture video signal. Although line flicker remains in this case, the video signal of the whole field can be outputted.

As described above, by reading twice the sub-picture video signal of the same field in reproducing the sub-picture video signal, with the second scanning being coincident with the first scanning line, a sub-picture without occurrence of line flicker can be attained. Although in this embodiment the video signal of an odd field is skipped, the present invention is not confined to this scheme, but alternatively the video signal of an even field may be skipped.

Next, the operation of the double-scanning conversion circuit 9 will be explained. FIG. 8 is a timing chart for explaining the double-scanning conversion operation. The time axis is segmented in ½ line periods (which will be termed ½H), as shown at the bottom of the figure.

Charts a and b show the double-scanning conversion operation for the main scanning line. The circuit consists of a line memory having a storage capacity of 2H (two 1H-capacity line memories in this embodiment), and the operation of one line memory is shown in Chart a and that of another line memory is shown in Chart b.

Since both line memories have a read frequency which is twice the write clock frequency, they read out in half the write period 1H. In Chart a, line R is written in 1H period and it is read out twice in the successive two ½H periods. Since reading and writing cannot be done concurrently, shown in Chart b is the reading and writing in the timing relation opposite to Chart a using another line memory. The double-scanning conversion operation for the interpolated scanning line is completely identical, and it is achieved by using line memories of 2H capacity. The operation is shown in Charts c and d in FIG. 8. The double-scanning conversion circuit 9 has its output becoming high impedance alternately at a ½H interval, and a main scanning line R and interpolated scanning line I are outputted to the output terminal 10 of the composite main and sub picture video signal as shown in Chart e.

According to this embodiment, a control circuit is provided for the skipping of field of the sub-picture, whereby a sub-picture without line flicker can be obtained.

Figure 9:
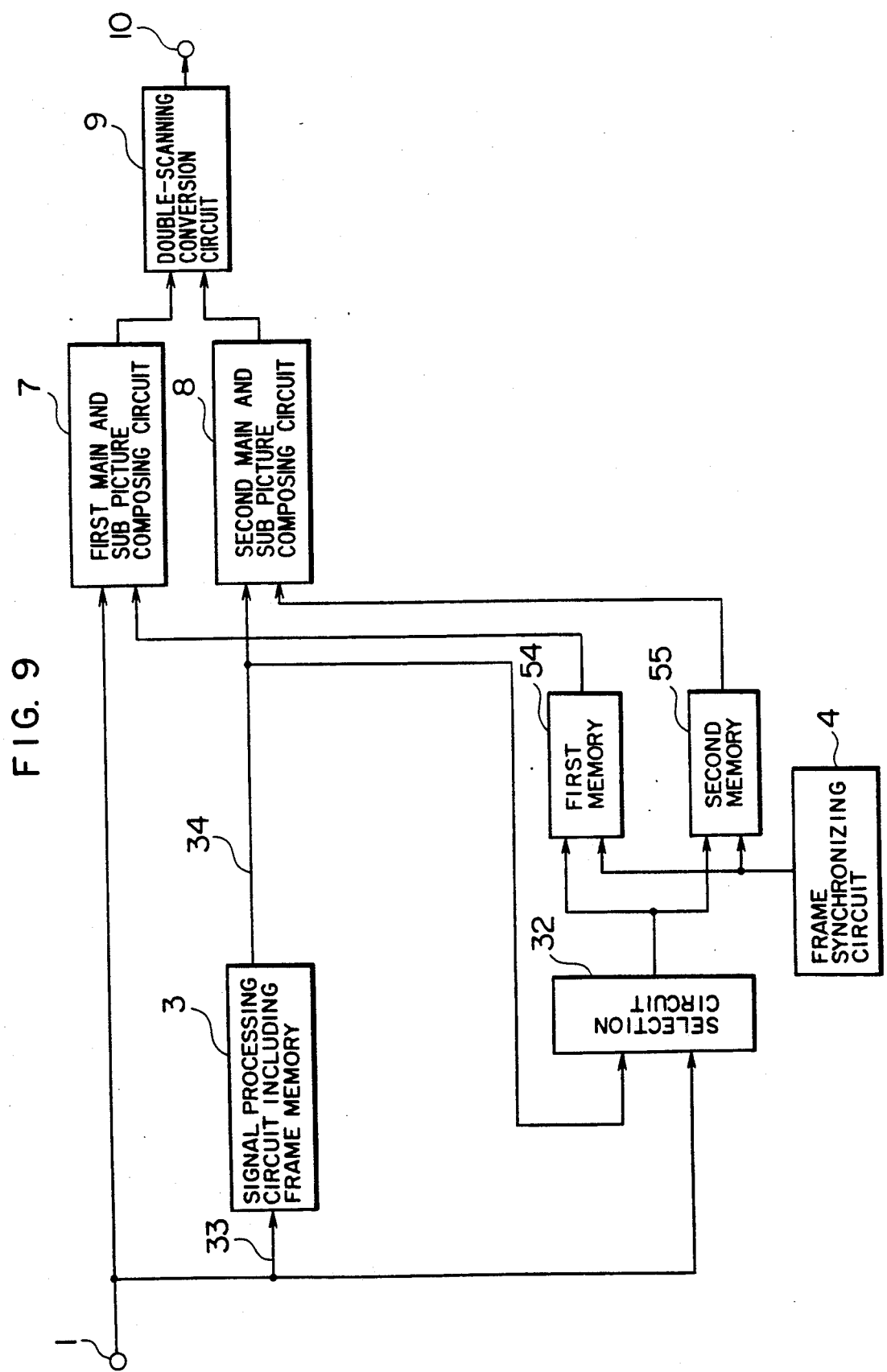
FIG. 9 is a block diagram of the picture-in-picture television receiver based on the second embodiment of this invention.

Next, the second embodiment of this invention will be described with reference to the drawings. FIG. 9 is a block diagram of the picture-in-picture television receiver according to the second embodiment of this invention, and it is intended to attain the P-in-P function by using only one video signal. In FIG. 9, 1 indicates an input terminal for the video signal, and 3 is a signal processing circuit including a frame memory and is connected to the video signal input terminal 1. 4 is a frame synchronizing circuit, and 7 and 8 are first and second main and sub picture composing circuits. 9 is a double-scanning conversion circuit, and 10 is an output terminal for the composite main and sub picture video signal. This arrangement is identical with that shown in FIG. 4. 54 and 55 designate first and second memories for storing one frame, each memory incorporating two field memories as shown in FIG. 5B, but they do not have the selection circuits 25 and 26 as in the first and second memories 5 and 6 of the first embodiment shown in FIG. 6.

The arrangement differs from the counterpart of FIG. 4 in the provision of a selection circuit 32 and the use of the main picture video signal and the output signal of the signal processing circuit 3 including frame memory for the input sub-picture video signal.

Figure 10:
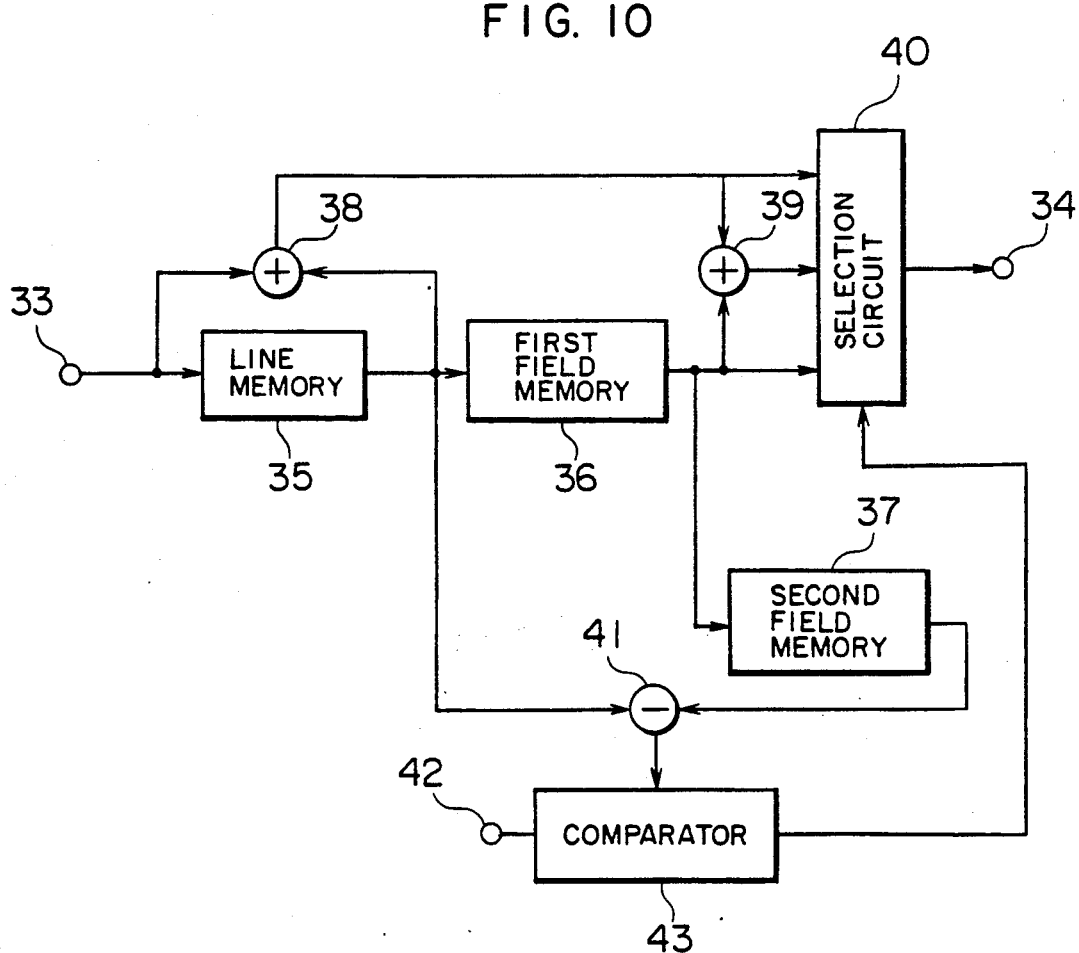
FIG. 10 is a block diagram showing an example of the signal processing circuit including frame memory shown in FIG. 9.

The operation of the two-frame television receiver arranged as described above will be explained in connection with FIGS. 10 and 11. FIG. 10 is a block diagram of an example of the signal processing circuit which implements the motion detection and scanning line interpolation. In FIG. 10, indicated by 33 is an input terminal for the video signal, 35 is a line memory connected to the input terminal 33, 36 and 37 are first and second field memories, and 38 is a first adder which evaluates the average of the input video signal and the output signal of the line memory 35. 39 is a second adder which evaluates the average of the output signal of the adder 38 and the output signal of the first field memory 36. 40 is a 3-input to 1-output multiplexer which selects one of the output signal of the first adder 38, the output signal of the second adder 39 and the output signal of the first field memory 36. 41 is a subtracter which detects the frame difference in the output signal of the line memory 35 and the output signal of the second field memory 37. 43 is a comparator which discriminates the magnitude of the output of the subtracter 41 based on the reference value applied to the reference terminal 42. 34 is an output terminal of the video signal delivered from the selection circuit 40.

Figure 11:
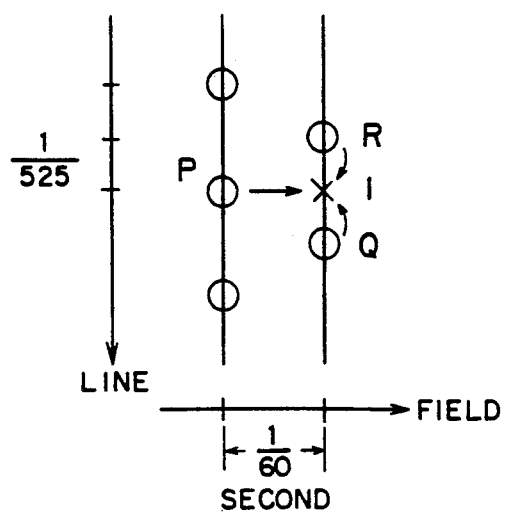
FIG. 11 is a diagram used to explain the relationship among interpolated pixels based on the arrangement of FIG. 10.

FIG. 11 is a diagram showing the relationship among interpolated pixels, and it is intended to explain the method of scanning line interpolation. The horizontal direction of the figure represents fields, and a piece of a picture is received at every 1/60 second. The vertical direction represents lines, and a picture is sent in 2/525 multiplied by the height of the face plate based on the interlaced scanning. Marked by "o" in the figure are pixels sent from the part of transmitter.

For a pixel indicated by Q in the input signal of the line memory 35, a pixel R is of the output signal of the line memory (since it is advanced by 1H). A pixel P and pixel R relate to be (one field—½H)=(525/2)H-½=262H, and therefore the output signal of the first field memory 36 in the pixel P. An interpolated pixel I is composed in the selection circuit 40 and it is supplied to the video signal output terminal 34. In producing the pixel I, a one-frame difference is detected by the subtracter 41 and its magnitude is discriminated with respect to the reference value by the comparator 43. In case the pixel is determined to be quiescent, the comparator 43 operates on the selection circuit 40 so that the video signal output terminal 34 is connected to the output terminal of the first field memory 36, thereby making the data of pixel P to be data for pixel I. In case the pixel I is determined to be moving, the selection circuit 40 selects the output signal of the first adder 38, i.e., the average of the pixel R and pixel Q. In this manner, the pixel I is produced through the control of the selection circuit 40 depending on the magnitude of one-frame difference. The produced video signal for the interpolated scanning line delivered from the output terminal 34 is fed together with the input video signal on the input terminal 1 to the selection circuit 32. As shown in FIG. 9, the interpolated video signal is fed to the second memory 55 and the input video signal is fed to the first memory 54 so that the selection circuit 32 introduces a signal as the sub-picture video signal, whereby a smooth sub-picture without line flicker can be realized.

Figure 12:
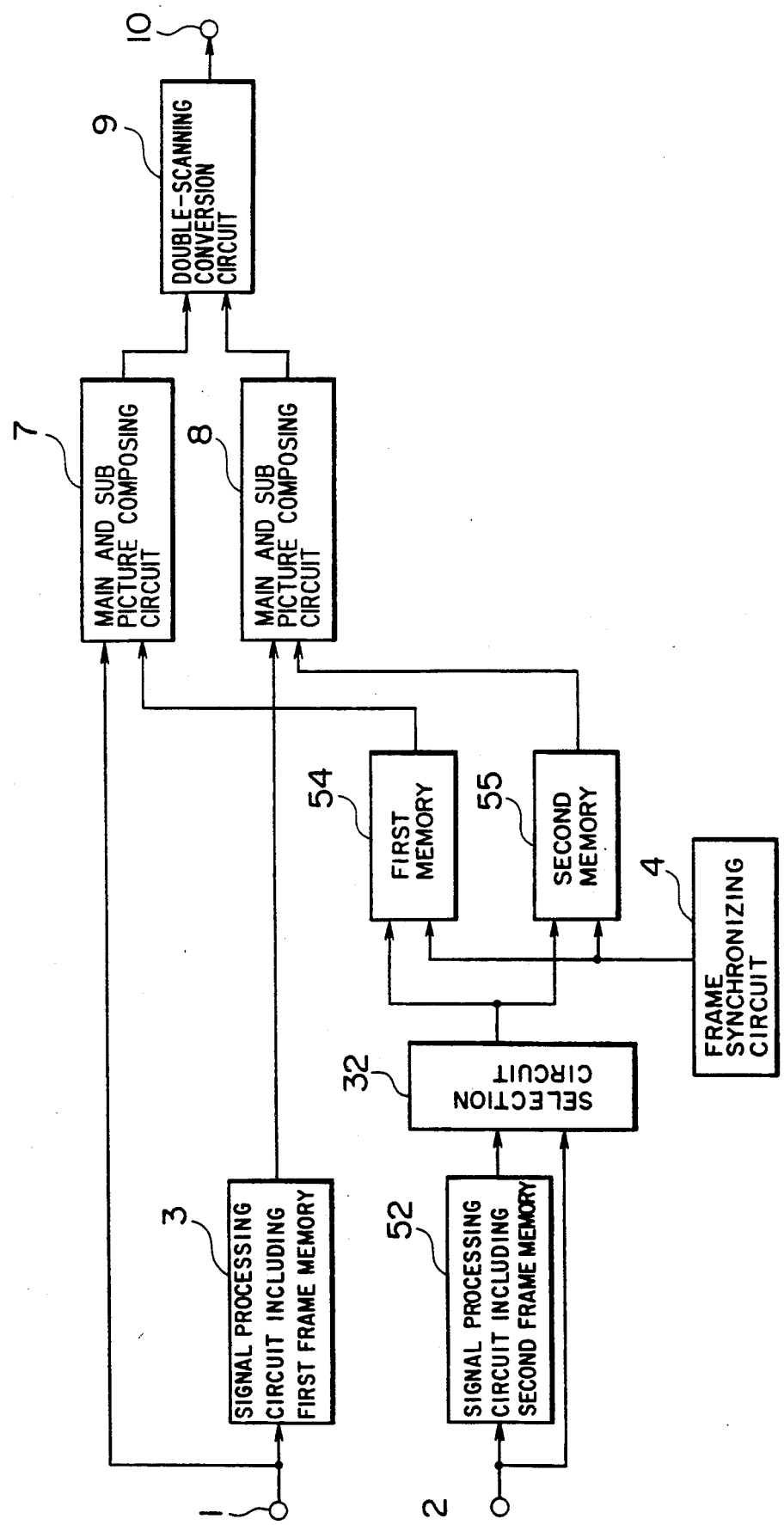
FIG. 12 is a block diagram of the picture-in-picture television receiver based on the third embodiment of this invention.

Next, the third embodiment of this invention will be described with reference to the drawings. FIG. 12 is a block diagram of the picture-in-picture television receiver according to the third embodiment of this invention. In FIG. 12, 1 is an input terminal for the main picture video signal, 2 an input terminal for the sub-picture video signal, 3 a signal processing circuit including a frame memory, and 4 is a frame synchronizing circuit. 54 and 55 are first and second memories for storing one frame of the sub-picture video signal, 7 and 8 are main and sub picture composing circuits. 9 is a double-scanning conversion circuit, and 10 is an output terminal for the composite main and sub picture video signal. This arrangement is identical to those shown in FIG. 4 and FIG. 9. The arrangement differs from the counterpart of FIG. 4 in the provision of a signal processing circuit 52 including a frame memory similar to the signal processing circuit 3 for the sub-picture video signal and a selection circuit 32 which selectively outputs either one of the output signal of the signal processing circuit 52 and the sub-picture video signal on the sub-picture video signal input terminal 2 to the first and second memories 54 and 55.

The operation of the picture-in-picture television receiver arranged as described above is as follows. The signal processing circuit 52 connected to the input terminal of the sub-picture video signal has the functions of one-frame motion detection, scanning line interpolation and other picture improvement. The selection circuit 32 operates to switch the main scanning line data and the interpolated scanning line data of the sub-picture video signal for every field so that line flicker does not occur, and delivers the selected data to the first and second memories 54 and 55. Namely, the input sub-picture video signal which is the sub-picture video signal for the main scanning line is fed to the first memory 54, while the output signal of the signal processing circuit 52 including the second frame memory which is the sub-picture video signal for the interpolated scanning line is fed to the second memory 55 by way of the selection circuit 32.

According to this embodiment, in which are provided for the sub-picture video signal the signal processing circuit 52 including frame memories and the selection circuit 32 which delivers selectively the output signal of the signal processing circuit 52 or the sub-picture video signal, a smooth sub-picture without line flicker can be realized even in the case where a main picture video signal and a sub-picture video signal differ from each other.

We claim:

1. A picture-in-picture double scanning television receiver comprising:
 sub-picture producing means for receiving an interlace scanned sub-picture video signal and outputting, to perform non-interlaced scanning, a first sub-picture video signal to be inserted into a main scanning line and a second sub-picture video signal to be inserted into an interpolated scanning line so that the relative phase relationship between the first and second sub-picture video signals become identical with each other, wherein said sub-picture producing means comprises a first and a second memory means for storing the input interlace scanned sub-picture video signal for two fields, respectively, a sub-picture video signal for one of said two fields read out from the sub-picture video signal for said two fields stored in said first memory means being delivered as said first sub-picture video signal and a sub-picture video signal for the other of said two fields read out from the sub-picture video signal for said two fields stored in said second memory means being delivered as said second sub-picture video signal;
 first main and sub-picture composing means for inserting the first sub-picture video signal into the interlace scanned main picture video signal;
 second main and sub-picture composing means for inserting the second sub-picture video signal which is used to convert the interlace scanned sub-picture video signal into the non-interlaced scanning mode, thereby producing a resultant composite signal; and
 double-scanning conversion means for receiving the output signal of said first and second main and sub-picture composing means and producing a non-interlace scanning video signal.

2. A picture-in-picture television receiver according to claim 1, wherein said sub-picture video signals such that the scan lines of the first sub-picture video signal when the main picture video signal has a field polarity of an even field and the scan lines of the second sub-picture video signal when the main picture video signal has a field polarity of an odd field are coincident on respective lines.

3. A picture-in-picture television receiver according to claim 1, wherein said sub-picture producing means produces the first and second sub-picture video signals such that the scan lines of the first sub-picture video signal when the main picture video signal has a field polarity of an odd field and the scan lines of the second sub-picture video signal when the main picture video signal has a field polarity of an even field are coincident on respective lines.

4. A picture-in-picture double scanning television receiver comprising:
 sub-picture producing means for receiving an interlace scanned sub-picture video signal and outputting, to perform non-interlaced scanning, a first sub-picture video signal to be inserted into a main scanning line and a second sub-picture video signal to be inserted into an interpolated scanning line so that the relative phase relationship between the first and second sub-picture video signals become identical with each other, wherein said sub-picture producing means comprises a first and a second memory means for storing the input interlace scanned sub-picture video signal, a signal read out of said first memory means being delivered as said first sub-picture video signal and a signal read out from said second memory means being delivered as said second sub-picture video signal;
 first main and sub-picture composing means for inserting the first sub-picture video signal into the interlace scanned main picture video signal;
 second main and sub-picture composing means for inserting the second sub-picture video signal which is used to convert the interlace scanned sub-picture video signal into the non-interlaced scanning mode, thereby producing a resultant composite signal; and
 double-scanning conversion means for receiving the output signal of said first and second main and sub-picture composing means and producing a non-interlace scanning video signal, wherein said sub-picture producing means comprises: control means for controlling (i) read out, from said first and second memory means, the signal on the field basis, and (ii) output of the read-out signals as said first and second sub-picture video signals respectively.

5. A picture-in-picture double scanning television receiver comprising:
 sub-picture producing means for receiving an interlace scanned sub-picture video signal and outputting, to perform non-interlaced scanning, a first sub-picture video signal to be inserted into a main scanning line and a second sub-picture video signal to be inserted into an interpolated scanning line so that the relative phase relationship between the first and second sub-picture video signals become identical with each other, wherein said sub-picture producing means comprises a first and a second memory means for storing the input interlace scanned sub-picture video signal, a signal read out of said first memory means being delivered as said first sub-picture video signal and a signal read out from said second memory means being delivered as said second sub-picture video signal;

first main and sub-picture composing means for inserting the first sub-picture video signal into the interlace scanned main picture video signal;

second main and sub-picture composing means for inserting the second sub-picture video signal which is used to convert the interlace scanned sub-picture video signal into the non-interlaced scanning mode, thereby producing a resultant composite signal;

double-scanning conversion means for receiving the output signal of said first and second main and sub-picture composing means and producing a non-interlace scanning video signal;

control means for reading out of said first and second memory means one of (i) a same signal twice on the field basis and (ii) signals on the frame basis; and a switch which operates on said control means to read out signals from said first and second memory means selectively either on the field basis or on the frame basis.

6. A picture-in-picture television receiver according to claim 5, wherein said control means operates on said first and second memory means in reading out signals on the frame basis such that, among the inputted interlace scanned sub-picture video signal, one of (i) a video signal of the even field and (ii) a video signal of the odd field is read out twice continuously.

7. A picture-in-picture television receiver comprising a first and second memories for storing a frame of video signal of a sub-picture of interfaced scanning, a frame synchronizing circuit which controls so that reading does not overtake writing for said first and second memories, a signal processing circuit including a frame memory which receives a video signal of a main picture of interlaced scanning and produces, for non-interlaced scanning, a main picture video signal for the interpolated scanning line, a first main and sub picture composing circuit which inserts the output signal of said first memory into the main picture video signal, a second main and sub picture composing circuit which inserts the output signal of said second memory into the output video signal of said signal processing circuit including frame memory, a circuit for implementing the double-scanning conversion for the output signal of said first and second main and sub picture composing circuits on the field basis, a control circuit which controls, for said first and second memories, the switching of the readout video signal on the field basis or the switching of the readout video signal on the frame basis, and a switch which selects whether or not the one-field skipping control by said control circuit is to be carried out.

8. A picture-in-picture television receiver according to claim 7, wherein each of said first and second memories incorporates a frame memory, and wherein said television receiver comprises a line memory connected to said second frame memory, a first selection circuit which selects the output signal of said second frame memory or the output signal of said line memory, a second selection circuit which selects the output signal of said first frame memory or the output signal of said first selection circuit, and a field polarity discrimination circuit which controls the switching of said first and second selection circuits by discriminating the field polarity of the main picture.

9. A picture-in-picture television receiver according to claim 8, wherein said signal processing circuit including frame memory comprises a line memory connected to the input terminal, a first field memory connected to the output of said line memory, a second field memory connected to the output of said first field memory, a first adder which evaluates the average of the video signal on said input terminal and the output signal of said line memory, a second adder which evaluates the average of the output signal of said first adder and the output signal of said first field memory, a three-input to one-output multiplexer which selects the output signals of said first and second adders and said first field memory, a subtracter which evaluates the one-frame difference in the output signal of said line memory and the output signal of said second field memory, and a comparator which discriminates the magnitude of the output signal of said subtracter, said selection circuit being controlled for switching in response to the output signal of said comparator.

10. A picture-in-picture television receiver comprising a signal processing circuit including a frame memory which produces a video signal for the interpolated scanning line for converting an input interlaced scanning video signal into the non-interlaced scanning mode, a two-input to one-output multiplexer which selects the interlaced scanning video signal or the output signal of said signal processing circuit including frame memory on the field basis, a first and second memories connected to the output of said selection circuit for storing one frame, a frame synchronizing circuit which implements control such that reading does not overtake writing for said first and second memories, a first main and sub picture composing circuit which inserts the output signal of said first memory into the input video signal, a second main and sub picture composing circuit which inserts the output signal of said second memory into the output signal of said signal processing circuit including frame memory, and a double-scanning conversion circuit which implements the double-scanning conversion for the output signals of said first and second main and sub picture composing circuits.

11. A picture-in-picture television receiver according to claim 10, wherein said signal processing circuit including frame memory comprises a line memory connected to the input terminal, a first field memory connected to the output of said line memory, a second field memory connected to the output of said first field memory, a first adder which evaluates the average of the video signal on said input terminal and the output signal of said line memory, a second adder which evaluates the average of the output signal of said first adder and the output signal of said first field memory, a three-input to one-output multiplexer which selects the outputs of said first and second adders and said first field memory, a subtracter which evaluates the one-frame difference in the output signal of said line memory and the output signal of said second field memory, and a comparator which discriminates the magnitude of the output signal of said comparator, said selection circuit being controlled for switching in response to the output signal of said comparator.

12. A picture-in-picture television receiver comprising a signal processing circuit including a first frame which receives a video signal of a main picture of interlace scanning and produces, for non-interlace scanning, a main picture video signal for the interpolated scanning line, a signal processing circuit including a second frame memory which receives a video signal of a sub-picture of interlace scanning and produces, for non-interlace scanning, a sub-picture video signal for the interpolated scanning line, a two-input to one-output multiplexer which selects the sub-picture video signal of interlace scanning or the output signal of said signal processing circuit including said second frame memory in a field-wise manner, a first and second memories connected to the output of said selection circuit for storing one frame, a frame synchronize circuit which implements control so that reading does not precede writing for said first and second memories, a first main and sub picture composing circuit which inserts the output signal of said first memory into the main picture video signal of interlace scanning, a second main and sub picture composing circuit which inserts the output signal of said second memory into the output signal of said signal processing circuit including said first frame memory, and a circuit which implements the double-speed conversion for the output signals of said first and second main and sub picture composing circuits.

13. A picture-in-picture television receiver according to claim 12, wherein said signal processing circuit including said first and second frame memories comprises a line memory connected to the input terminal, a first field memory connected to the output of said line memory, a second field memory connected to the output of said first field memory, a first adder which evaluates the average of the video signal on said input terminal and the output signal of said line memory, a second adder which evaluates the average of the output signal of said first adder and the output signal of said first field memory, a three-input to one-output multiplexer which selects the output signals of said first and second adders and said first field memory, a subtracter which evaluates the one-frame difference in the output signal of said line memory and the output signal of said second field memory, and a comparator which discriminates the magnitude of the output signal of said subtracter, said selection circuit being controlled for switching in response to the output signal of said comparator.

* * * * *